United States Patent
Weiberle et al.

(10) Patent No.: US 6,299,261 B1
(45) Date of Patent: Oct. 9, 2001

(54) ELECTRIC BRAKE SYSTEM FOR A MOTOR VEHICLE

(75) Inventors: Reinhard Weiberle, Vaihingen/Enz; Peter Blessing, Heilbronn, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/330,956

(22) Filed: Jun. 11, 1999

(30) Foreign Application Priority Data

Jun. 12, 1998 (DE) .............................................. 198 26 131

(51) Int. Cl.[7] .................................................... B60T 13/66
(52) U.S. Cl. ................ 303/20; 303/122.04; 303/DIG. 9; 318/362
(58) Field of Search ......................... 303/122.04, 122.05, 303/DIG. 9, 20; 307/10.1; 318/362; 244/110 H, 110 V, 110 A, 111

(56) References Cited

U.S. PATENT DOCUMENTS

| | | | |
|---|---|---|---|
| 4,546,437 | * 10/1985 | Bleckmann et al. | 303/122.05 |
| 4,784,442 | * 11/1988 | Peterson | 303/15 |
| 5,588,719 | * 12/1996 | Bailleux | 303/122.04 |
| 5,952,799 | * 9/1999 | Maisch et al. | 303/20 |
| 5,954,407 | * 9/1999 | Schramm et al. | 303/155 |
| 5,961,190 | * 10/1999 | Brandmeier et al. | 303/20 |
| 5,962,931 | * 10/1999 | Maron et al. | 303/122.04 |

FOREIGN PATENT DOCUMENTS 19634 567  3/1998  (DE) .

* cited by examiner

Primary Examiner—Robert J Oberleitner
Assistant Examiner—Robert A. Siconolfi
(74) Attorney, Agent, or Firm—Kenyon & Kenyon

(57) ABSTRACT

An electric brake system for a motor vehicle includes a first unit which receives operating signals from at least one driver-operated brake operating element and determines the setpoints for controlling the wheel brakes on the basis of the operating signals. The electric brake system also includes second units assigned to the wheel brakes of the motor vehicle to convert the setpoints into control signals for the wheel brakes. The second units are each assigned individually to an individual wheel brake, and each includes a self-monitoring microcomputer system. At least one of the second units is assigned to the front wheel brakes, and at least one unit is assigned to the rear wheel brakes. At least the second unit assigned to the front wheel brakes is redundantly connected to the other units via two communication systems.

13 Claims, 8 Drawing Sheets

ELECTRIC BRAKE SYSTEM FOR A MOTOR VEHICLE

FIELD OF THE INVENTION

The present invention relates to a decentralized electric brake system (brake by wire) for a motor vehicle, which takes into account in particular the high technical demands with regard to safety and availability due to its decentralized designed.

BACKGROUND INFORMATION

A previously proposed electric brake system is described, for example, in German Published Patent Application No. 196 34 567. The brake system described there has a decentralized structure, where a pedal unit to form the reference input variable intended by the driver, optionally a processing unit for taking into account additional functions as well as wheel pair units to control or regulate the controlling elements of the wheel brakes are connected by one or more communication systems. Furthermore, the brake system receives power from at least two on-board electric systems. This guarantees sufficient safety and availability of the brake system. With this known system, wheel pair units are provided, and two wheel brakes are assigned to each unit. The wheel pair units each have essentially two microcomputers which monitor one another. Each microcomputer is assigned to another wheel brake and controls it according to the setpoints. The resulting operating reliability and availability are not optimal for all applications.

SUMMARY OF THE INVENTION

An object of the present invention is to provide measures for optimizing the operating safety and availability of an electric brake system, in particular in the area of wheel brake control units.

The operating safety and availability of the brake system according to the present invention is optimized by assigning each wheel brake a control unit which contains a self-monitoring and control system-monitoring computer system. Each of these wheel units implements control of the wheel brake application force or wheel braking torque for each wheel brake individually.

It is especially advantageous in one embodiment that, due to the redundancy of the communication system connecting the units, the brake function of only one wheel is lost even in the event of a failure in the power source or in a communication system.

It is especially advantageous that monitoring of the sensor for the brake application force or the braking torque of a wheel is made possible. This effectively prevents wheel brake malfunction as a result of a sensor error.

In addition, self-monitoring of proper functioning of the computer system of a wheel unit is provided, implemented by various calculations and a query/response communication between a microcomputer system and a monitoring component.

DETAILED DESCRIPTION

A method of controlling or regulating the operating brake function and the parking brake function of the brake system of a motor vehicle is achieved according to the present invention. Due to the decentralized division of the brake system and the redundancies in the system, braking functionality is maintained at a high degree, and the operating safety of the brake system is ensured whenever static and dynamic faults occur. In addition, fault states are saved for service purposes and optionally signaled. The abbreviations for components and signals used in the text and the figures are listed in the addendum.

Figure 1:
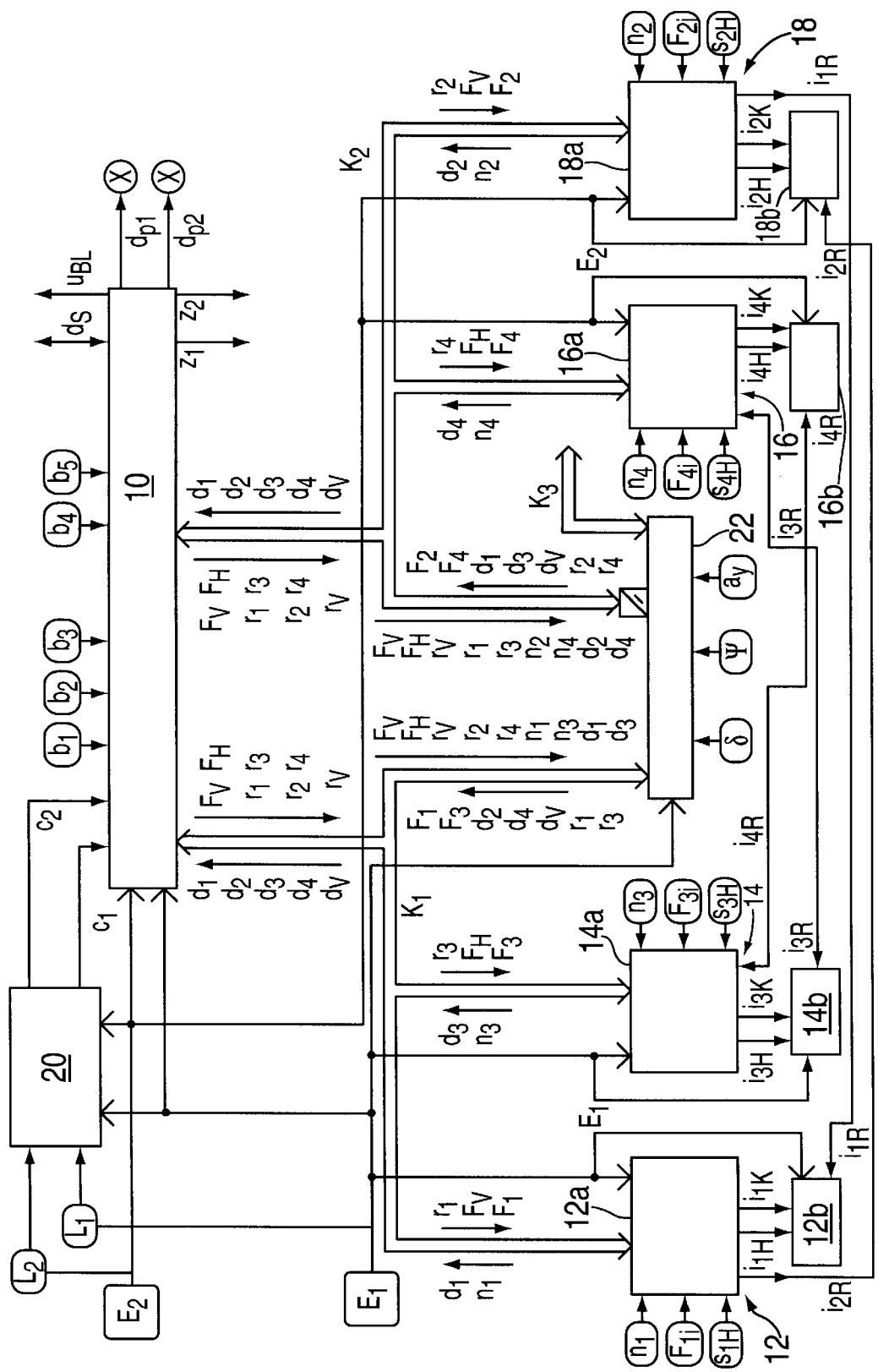
FIG. 1 shows a first embodiment of the structure of an electromechanical brake system according to the present invention.

FIG. 1 shows a first embodiment of the structure of an electromechanical brake system according to the present invention and the signals exchanged in each case. This system is characterized by a decentralized structure based on the system components: pedal unit 10, four wheel units 12, 14, 16 and 18, power diagnostic unit 20 and processing unit 22.

Pedal module 10 of the electromechanical brake system is responsible primarily for detecting the driver's intention regarding braking, analyzing of the overall system status, and initiating release strategies in the event of an error.

Each wheel unit (12, 14, 16, 18) is composed of a wheel module (12a, 14a, 16a, 18a), wheel sensors (see example, $n_1$, $F_{1i}$, $s_{1H}$, etc.) and an actuator (12b, 14b, 16b, 18b). Each wheel module (12a, 14a, 16a, 18a) includes a microcomputer system, a monitoring component, and the power electronics for controlling the actuator.

The electric system receives power from the two independent on-board electric systems $E_1$ and $E_2$. Two wheel units in each case receive power from the same power source. With the system structure illustrated in FIG. 1, a diagonal division is assumed, i.e., the wheel units (12, 14) for the left front and right rear wheels receive power from the same power source $E_1$.

The same applies to the wheel units (16, 18) for the right front and left rear wheels, which receive power from power source $E_2$. An embodiment where the two wheel units of one axle are assigned to one power source is also possible. However, it will not be considered further here. With this division, the procedures described below are likewise used with the same advantages. The wheel units are arranged in proximity to the respective wheel brake, while the pedal unit and processing unit are mounted together or separately at a central location.

The data exchange between the individual components of the brake system is accomplished using two independent communication systems $K_1$ and $K_2$, preferably implemented as serial bus systems, e.g., CAN. Communication systems $K_1$ and $K_2$ receive power from the different on-board electric systems. Furthermore, the connection to the control unit of the engine management is implemented by communication system $K_3$.

In each wheel module (12a, 14a, 16a, 18a), control of the respective actuator (12b, 14b, 16b, 18b) for adjusting the desired brake application force or the desired braking torque is implemented. To do so, either the wheel brake application force and/or the wheel braking torque is/are detected by sensors in each actuator (12b, 14b, 16b, 18b). The electromechanical actuator (12b, 14b, 16b, 18b) acts on the brake application paths of disk brakes or drum brakes by way of a gear stage without an intermediate hydraulic stage. The wheel unit (12, 14, 16, 18) therefore regulates the brake application force and the braking torque individually for each wheel. The required reference input variable is preset via the respective bus system.

In a preferred embodiment, the actuator (12b, 14b, 16b, 18b) of a wheel unit also contains an electromagnetically operated rack-out device (controlled via $i_{1K}$, $i_{2K}$, $i_{3K}$, $i_{4K}$) which executes the parking brake function and also locks the brake system in the prevailing position without any power consumption in steady-state braking phases. A reset device is also integrated into the actuator (12b, 14b, 16b, 18b) of each wheel (controlled via $i_{1R}$, $i_{2R}$, $i_{3R}$, $i_{4R}$), which would cause a safety disconnect of the respective wheel in the event of any type of fault that could prevent one wheel's brake from being released. To be able to handle these types of faults in the failure of a power diagnostic unit (20), the reset device is controlled by the next wheel unit on the same axle (e.g., from 18a for 12b). With the diagonal division of the power circuits considered here, the two wheel units of one axle always receive power from different power sources. Therefore, in the event of a failure in one power source in any state, at least the respective actuator will be released by the reset device.

The power diagnostic module (20) determines the charge state of the power supply units and relays this information ($c_1$, $c_2$) to the pedal module (10).

A detailed description of the functions and structure of the system components of the electromechanical brake system is given in the following sections with reference to FIGS. 2 through 5.

Figure 2:
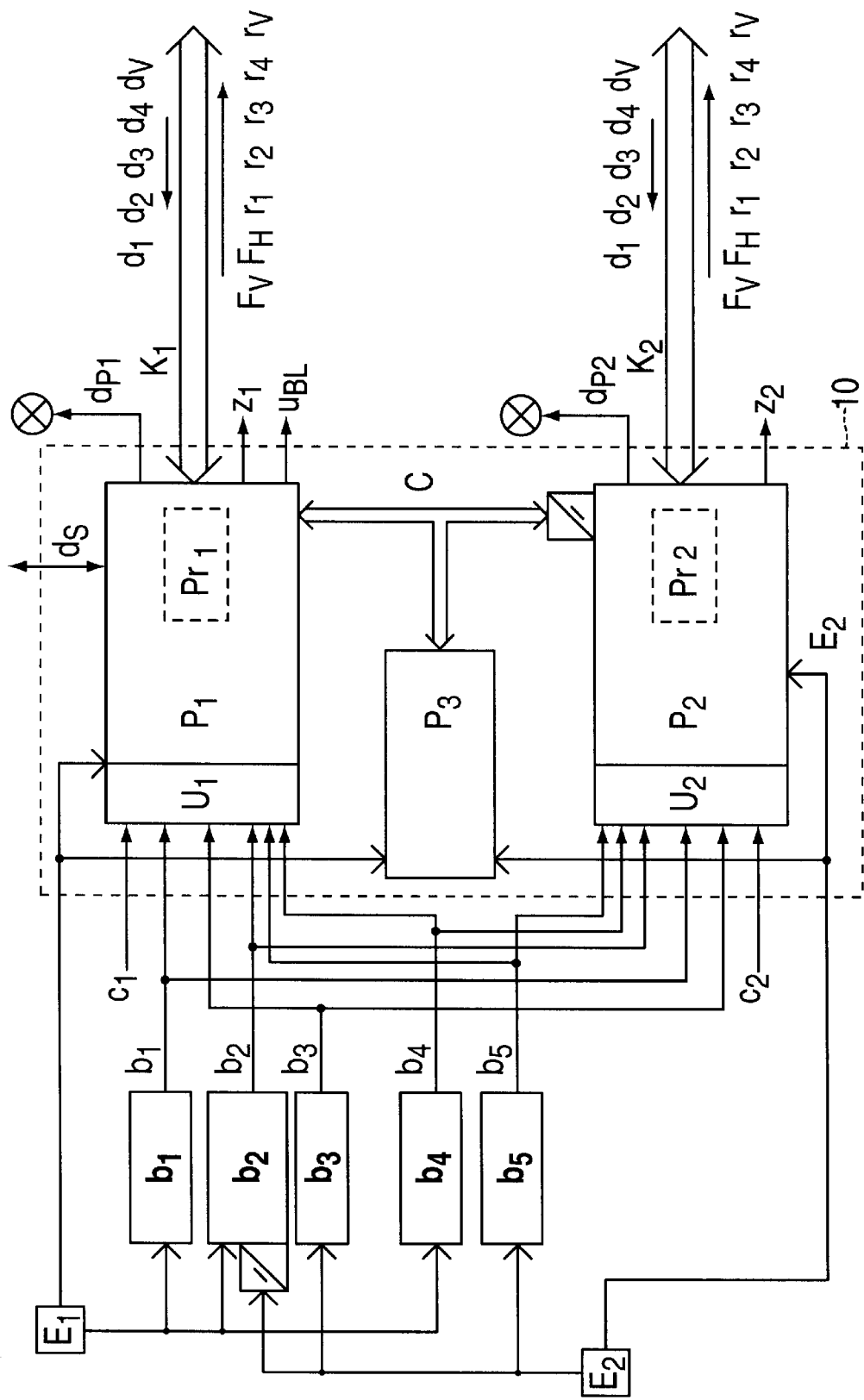
FIG. 2 illustrates a structure of a pedal unit employed in the system according to the present invention.

FIG. 2 shows the basic design of the pedal module (10).

The object of these system components is to detect the driver's braking intention, specifically with regard to the operating brake and the parking brake, and to form the required reference input variables for the front and rear axle wheels; to detect and analyze the status messages of all the system components of the electromechanical brake system; to analyze the prevailing overall state of the brake system, optionally initiating release measures and signaling the fault state to the driver and/or storing it in the error memory; to initialize all components of the brake system after turning on the ignition or operating the brake when the ignition is turned off; to turn off the brake system after a road trip is concluded; and to control the brake light.

The driver's intention regarding the operating brake is detected by independent sensors $b_1$, $b_2$ and $b_3$, which preferably detect the analog intention of the driver (brake pedal angle and/or the force of operation) on the brake pedal in various implementations. The sensors receive power from different power supplies $E_1$ and/or $E_2$, e.g., sensors $b_1$ and $b_2$ receive power from power supply $E_1$, and sensors $b_2$ and $b_3$ receive power from power supply $E_2$. The driver's intention regarding operation of the parking brake is detected by sensors $b_4$ and $b_5$ (likewise by detecting the deflection of the parking brake lever, for example), which receive power from the different power supplies. Each analog sensor for detecting the driver's intention regarding the operating brake as well as one for the parking brake can also be replaced by a binary sensor.

Pedal module (10) itself is designed to be fault-tolerant, e.g., by implementation in the form of a redundant microcomputer system with microcomputers $P_1$ and $P_2$, also containing the required peripheral, memory, and watchdog modules plus a monitoring component $P_3$. Microcomputers $P_1$ and $P_2$ and monitoring component $P_3$ communicate via internal communication channel C, which is implemented by a serial bus system or serial interfaces, for example. Independent programs Pr1 and Pr2 are implemented within microcomputer systems $P_1$ and $P_2$. Sensor signals $b_1$ through $b_5$ are detected and stored by computer program Pr1 via input interface $U_1$ and made available to microcomputer $P_2$ via communication channel C. In a similar marmer, sensor signals $b_1$ through $b_5$ are detected and stored by computer program Pr2 via input interface $U_2$ and transmitted to microcomputer $P_1$. Thus, six measured values representing the driver's intention regarding operation of the operating brake and four measured values representing the driver's intention regarding operation of the parking brake are available in both computers.

A representative signal value $b_{B,rep}$ for the driver's intention regarding the operating brake is determined from the measured values for operation of the operating brake by majority selection in each microcomputer $P_1$ and $P_2$. This is done by weighting possible individual faults, and by not including individual measured values that exceed the others by a certain amount to form the reference values. Reference values calculated in microcomputers $P_1$ and $P_2$ are designated as $b_{B,rep,1}$ and $b_{B,rep,2}$. If reference value $b_{B,rep,1}$ exceeds a predetermined limit, the brake light is controlled by signal $U_{BL}$.

Representative signal values are also calculated in both microcomputers $P_1$ and $P_2$ from the measured values representing the driver's intention regarding operation of the parking brake. The representative signal values determined in microcomputers $P_1$ and $P_2$ are designated as $b_{F,rep,1}$ and $b_{F,rep,2}$. These representative signal values are the maximum values of measured sensor signals $b_4$ and $b_5$ when the passenger vehicle is standing still (determined by analyzing one or more wheel speed signals), and when the vehicle is moving (i.e., not at standstill), they are the minimum values of these two sensor signals.

The reference input variable for the desired average brake application force or the desired average braking torque of a wheel when braking with the operating brake is calculated from reference values $b_{B,rep,1}$ and $b_{B,rep,2}$ both microcomputers using a stored pedal characteristic. This reference input variable is designated as $F_{B,res,1}$ in microcomputer $P_1$ and as $F_{B,res,2}$ in microcomputer $P_2$.

The driver's intention regarding the average brake application force or the average braking torque of a wheel when operating the parking brake is also determined from sensor signals $b_{F,rep,1}$ and $b_{F,rep,2}$ in microcomputers $P_1$ and $P_2$ using a stored predetermined characteristic. This reference input variable is designated as $F_{F,res,1}$ in microcomputer $P_1$ and as $F_{F,res,2}$ in microcomputer $P_2$.

The reference input variables calculated in a microcomputer for the driver's intention regarding the operating brake and the parking brake are made available to the other microcomputer via internal communication channel C. In both microcomputers, $F_{B,res,1}$ is compared with $F_{B,res,2}$ and $F_{F,res,1}$ with $F_{F,res,2}$. If the comparison values in each pair match within a predetermined tolerance limit, a resulting variable is formed for the driver's intention regarding the operating brake $F_{B,res}$ by arithmetic averaging of variables $F_{B,res,1}$ and $F_{B,res,2}$, and the resulting variable for the driver's intention regarding the parking brake $F_{F,res}$ is formed by arithmetic averaging of variables $F_{F,res,1}$ and $F_{F,res,2}$.

If the comparison values do not match, the fault-free signal values for the driver's intention regarding the operating brake as well as the parking brake are detected unambiguously by monitoring component $P_3$ on the basis of the computer monitoring described below. In both microcomputers $P_1$ and $P_2$, the fault-free signal values are assigned to variables $F_{B,res}$ and $F_{F,res}$.

The resulting average brake application force $F_{res}$ of a wheel is obtained from signals $F_{B,res}$ and $F_{F,res}$ according to the equation $F_{res}$=maximum($F_{B,res}$, $F_{F,res}$). In an alternative embodiment, $F_{res}$ could also correspond to the resulting average braking torque of a wheel which is required due to operation of the operating brake or parking brake. The desired brake application forces and braking torques $F_V$ for the wheels of the front axle and $F_H$ for the wheels of the rear axle are calculated from $F_{res}$ in the sense of a suitable division.

The pedal module transmits the setpoints for the brake application forces and braking torques $F_V$ and $F_H$ via communication systems $K_1$ and $K_2$ to the connected components of the electromechanical brake system.

Faults that would lead to unintentional braking or an incorrect reference input variable for the wheel brake application force and wheel braking torque are detected by different detections and calculations. Corrupted memory contents, which would lead to an identical error effect, are also detected. Monitoring component $P_3$ communicates with microcomputers $P_1$ and $P_2$ by way of internal bus system C. This component serves to monitor the program sequences in programs Pr1 and Pr2 and also to check the computing capability of microcomputers $P_1$ and $P_2$. To guarantee reliability in the event of a computer error in $P_1$ or $P_2$, programs Pr1 and Pr2 must nevertheless run properly in this error case, or the fact that the program is not running properly must be detected reliably. If a program is not running properly, the respective computer channel is disconnected, and the error is signaled by signals $d_{P1}$ and $d_{P2}$. In the embodiment shown here, functionality is monitored by a query/response communication. Microcomputers $P_1$ and $P_2$ retrieve a query from the monitoring component and answer it, taking into account all safety-relevant program parts within a predetermined interval of time. The queries are to be preset so that a correct response is given only with error-free functioning of these program parts, in particular the computer function test (RAM test, ROM test, etc.) and the command status check (with regard to addition, subtraction, etc.). The partial responses formed from the subprograms are combined to form an overall response in each microcomputer. In the monitoring component, the overall responses supplied by microcomputers $P_1$ and $P_2$ are checked with regard to the interval of occurrence and bit-accurate correspondence to the correct response for the query and optional error control strategies such as signaling and channel disconnection are initiated. The functionality of the monitoring component is tested by microcomputers $P_1$ and $P_2$ using suitable test questions. These test questions can be answered correctly by the monitoring component only if the function is completely correct.

Furthermore, internal error states and error signal messages $d_1$, $d_2$, $d_3$ and $d_4$ of the connected the connected wheel units and error message $d_V$ of the processing unit are detected in the pedal module and stored in an error memory. Furthermore, status signals $c_1$ and $c_2$ of the power diagnostic unit are detected. This detection takes place during a test phase before the start of a journey and also in all operating phases of a journey. All the errors and status signals are analyzed in the pedal module by using predetermined tables in which an action to be carried out is stored for each type of error and each status. As a result of this analysis, messages for release strategies in the various components of the brake system are initiated in the travel phase in accordance with the risk potential of the error states and are transmitted to the processing unit and the wheel units by signals $r_1$, $r_2$, $r_3$, $r_4$ and $r_V$. Safety-relevant faults are signaled to the driver by error signals $d_{P1}$ and $d_{P2}$. The driver is also signaled when error states are detected in the test phase before starting a journey. With safety-critical errors, initialization of the brake system is terminated and release of the parking brake is prevented. When safety-critical operating states occur during a journey, intervention in the engine management can be implemented to reduce the available driving torque.

The other components of the electromechanical brake system are initialized by the pedal module using signal lines $z_1$ and $z_2$ after turning on the ignition or even when operating the brakes when the ignition is turned off. Furthermore, the system components are turned off by these signals in a controlled manner at the end of the journey.

Access to the brake system and a readout of the error memory for the overall system are made possible for service personnel via service interface $d_s$.

The power diagnostic unit (20) is responsible for monitoring the power supply units (batteries) with regard to adequate capacity for the power required for the braking operations. Therefore, at least the power required for the minimum braking effect stipulated by law must be guaranteed. Monitoring is performed by suitable sensors $L_1$ and $L_2$, e.g., for measuring the charging current and the load current, and a mathematical model. This model takes into account the electrochemical and physical properties as well as the history, e.g., the number of exhaustive discharges, of the power supply units. The power diagnostic unit (20) is preferably implemented in the form of a redundant microcomputer system which receives power from both power sources and whose subsystems can exchange data via an internal bus system.

The higher-level functions of the brake system are implemented in the processing unit (22). These include in particular the calculations of reference input variables $F_1$, $F_2$, $F_3$ and $F_4$ for the brake application forces and braking torques of each individual wheel. The calculations are performed by including known principles such as taking into account the wheel-specific rotational speeds in full braking in the sense of an anti-skid system, taking into account a drive slip control function, implementing drive dynamics control to prevent overspeed states by including additional sensors, e.g., for steering wheel angle $\delta_L$, transverse acceleration $a_y$, and yaw angle velocity $\psi$, taking into account the thickness of the brake lining for each individual wheel in partial braking with the goal of achieving uniform brake lining wear, implementation of a hill-holder function, taking into account the load state to achieve an optimum distribution of braking force to the wheels of the front and rear axles, achieving an adaptive braking force distribution between the wheel on the inside of the curve and the wheel on the outside of the curve on one axle as a function of the measured steering angle to achieve improved drive dynamics, correcting the individual braking forces in the event of failure of one wheel unit, controlled interventions in the engine management with a braking intention via communication system $K_3$ and intervening in the engine management in the case of a safety-critical fault in the brake system. In addition, the measured actual values of controlled variables $F_{1i}$, $F_{2i}$, $F_{3i}$ and $F_{4i}$ are also available to the processing unit for calculation of reference input variables $F_1$ through $F_4$ for each individual wheel. In addition, reference variables regarding drive dynamics can optionally be determined to support the monitoring functions within the wheel units. Details are explained in the description of the functions of the wheel unit.

Figure 3:
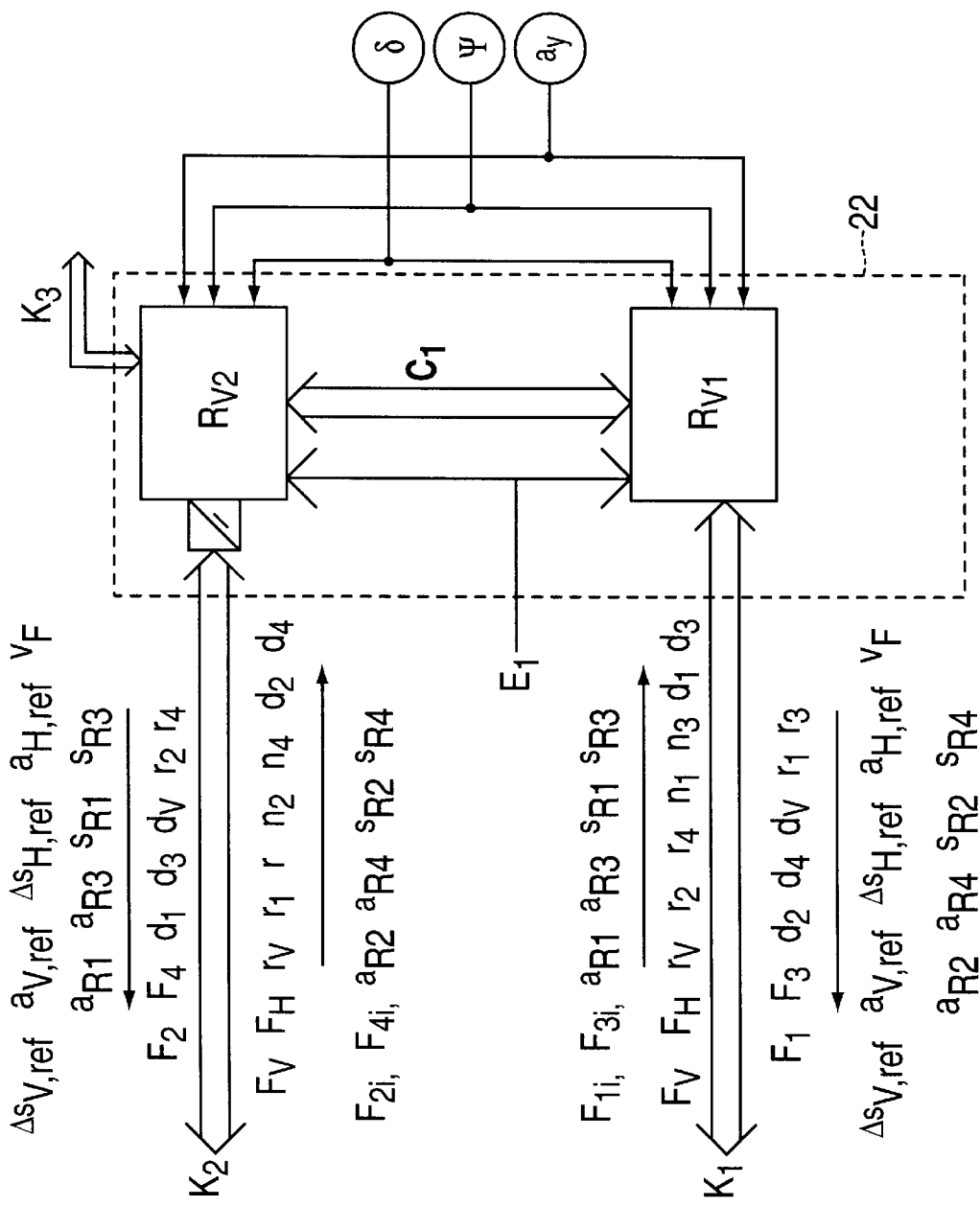
FIG. 3 shows a structure of a processing unit employed in the system according to the present invention.

The processing unit (22) according to FIG. 3 has a redundant design due to two microcomputer systems $R_{V1}$ and $R_{V2}$ which exchange calculated data via an internal communication channel C1. Via the two communication systems $K_1$ and $K_2$, the processing unit (22) receives the individual rotational speeds ($n_1$ through $n_4$) for each wheel as well as the actual values of the brake application force and the braking torque ($F_{1i}$ through $F_{4i}$) from the wheel units (12 through 18), and from the pedal unit (10) it receives the reference input variables for the brake application force and the braking torque for the wheels of the front axle $F_V$ and for the wheels of the rear axle $F_H$.

In the event of a failure of one computer channel in the pedal unit (10), the data transport via the connected communication system is interrupted. With this error constellation, the processing unit (22) relays reference input variables $F_V$ and $F_H$ as well as messages ($r_1$ through $r_4$) for the individual axles received from the other computer channel of the pedal module (10) for the release strategies to the connected wheel units (12 through 18). In addition, with this error, the diagnostic messages ($d_1$ through $d_4$) of the wheel units can be relayed to the functional computer channel of the pedal module. The failure of microcomputer $P_2$ in the pedal module (10) will be considered as an example. In this error case, the messages from the pedal module (10) can be relayed to wheel modules 2 and 4 via communication system $K_1$ and the processing unit. The diagnostic messages from wheel modules 2 and 4 take the opposite route. In addition, to calculate the reference input variables for the individual wheels as needed for a drive dynamics control function, the required parameters (steering angle, transverse acceleration and rotational rate) are determined in the processing unit (22).

The above-mentioned calculations are performed independently in the two computer systems $R_{V1}$ and $R_{V2}$ and then compared. If the results are inconsistent, the processing unit is shut down and an error status message $d_V$ is sent via the communication system.

Control of the brake application forces and braking torques for each individual wheel is implemented within the wheel units (12 through 18). Communication systems $K_1$ and $K_2$ supply the reference input variables for this purpose.

The wheel units (12 through 18) receive power from different electrical power sources, namely wheel units 12 and 14 from power source $E_1$ and wheel units 16 and 18 from power source $E_2$. The connection of the wheel units (12 through 18) to the other system modules is also implemented with different communication systems. Wheel units 12 and 14 communicate via $K_1$, and wheel units 16 and 18 communicate via $K_2$.

Figure 4:
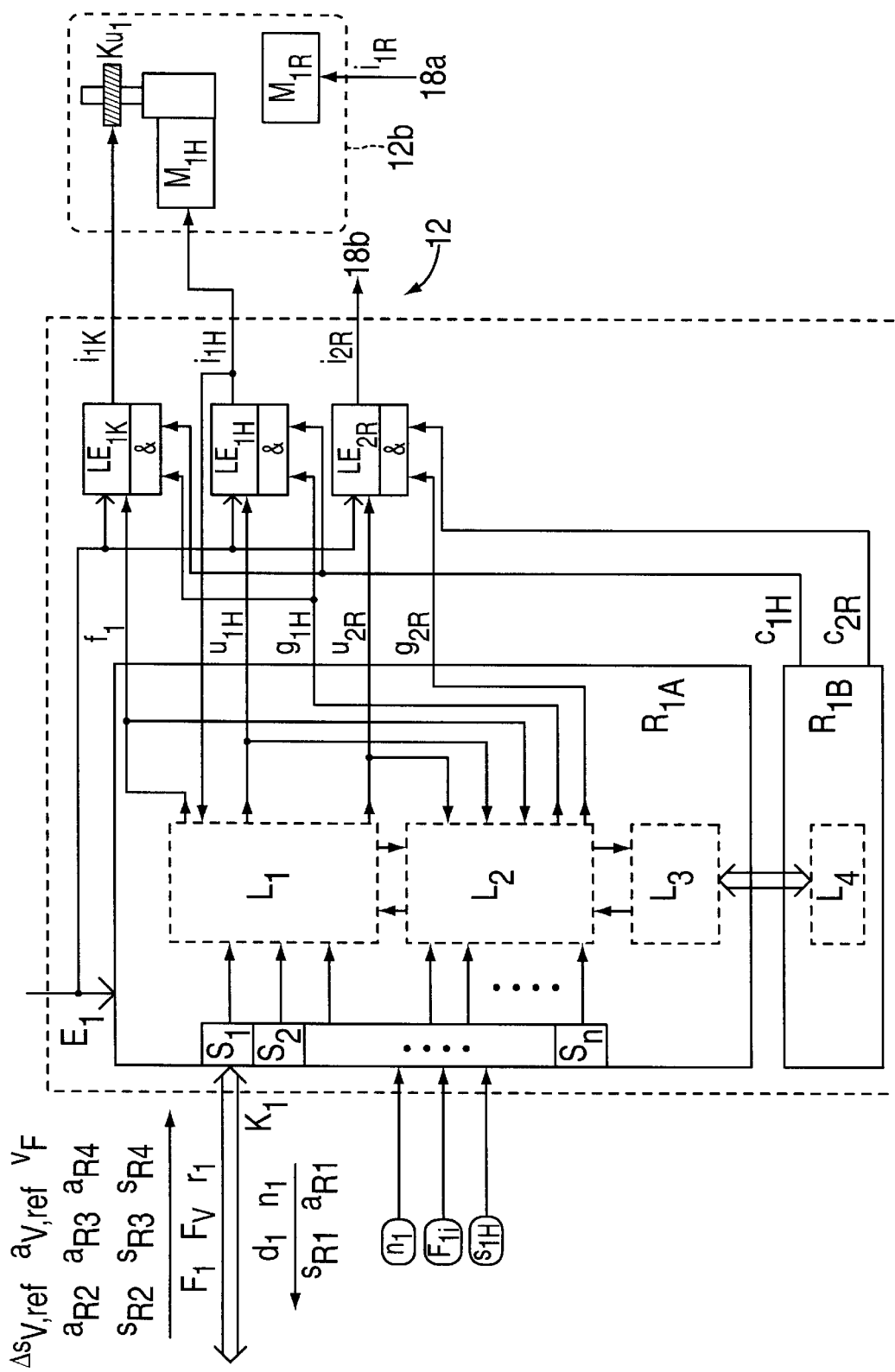
FIG. 4 is a first illustration of a wheel unit employed in the system according to the present invention.
Figure 5:
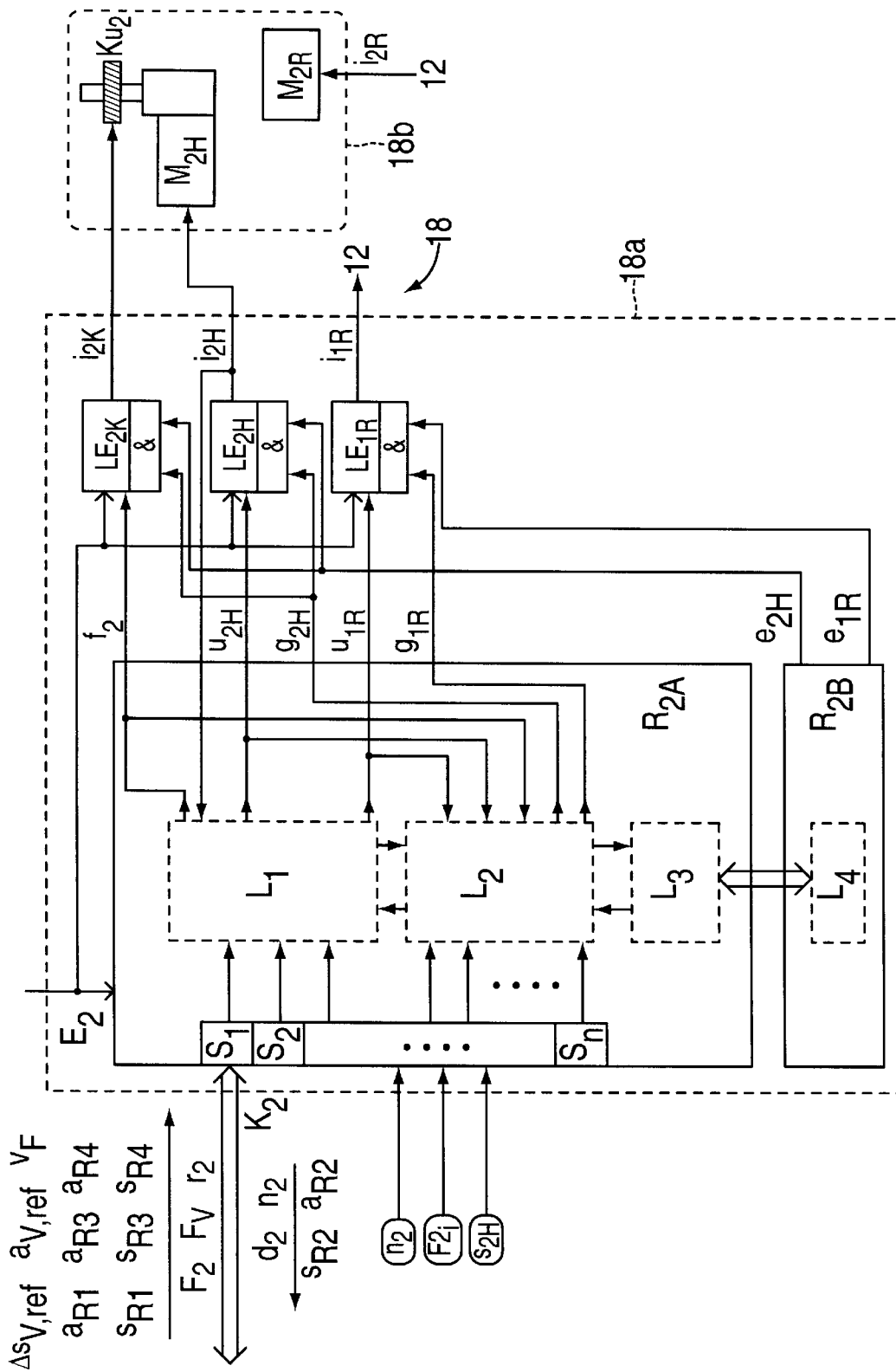
FIG. 5 is a second illustration of a wheel unit employed in the system according to the present invention.
Figure 6:
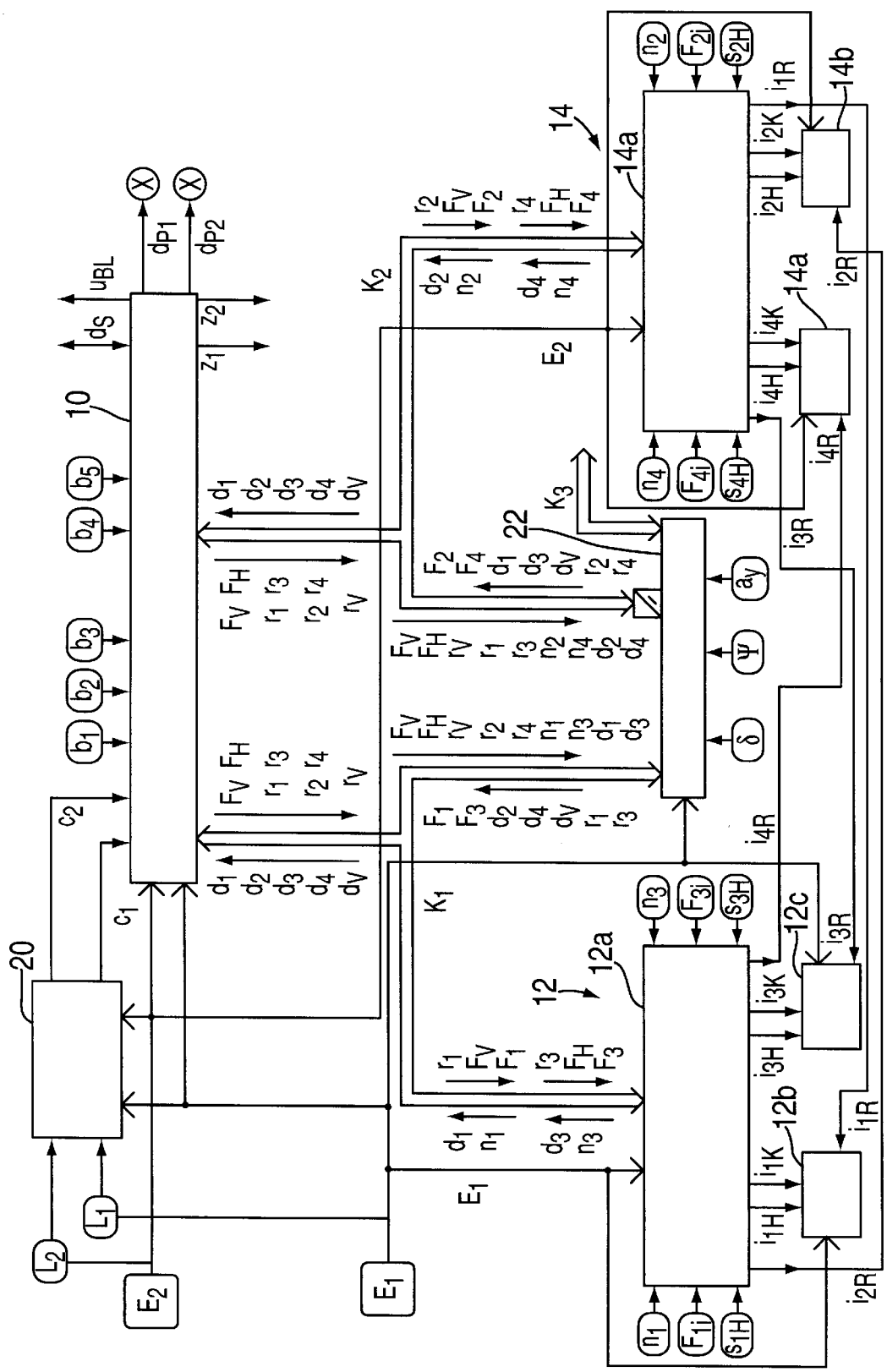
FIG. 6 illustrates a second embodiment of an electromechanical brake system according to the present invention.

Wheel unit 12 according to FIG. 4 is considered below. The other wheel units are designed accordingly. Wheel unit 12 serves to regulate the brake application force or the braking torque of a wheel and to initiate a retraction strategy when there is a disturbance in actuator 18b of wheel unit 18. Wheel unit 12 communicates with the other system components via communication system $K_1$. The wheel unit receives the following variables via this system:

$F_1$: Reference input variable for each individual wheel for regulating the brake application force or the braking torque of the wheel. This variable is supplied at the time of an ABS, ASR or FDR (drive dynamics control) intervention by the processing unit (22). This reference input variable could also be calculated specifically by the processing unit (22) for the following functions in another embodiment:
 a) to achieve uniform wear on all brake linings of a vehicle;
 b) to adapt the distribution of the driver's intention regarding the total brake torque among the wheels of the front and rear axles as a function of the instantaneous axial load distribution;
 b) to achieve an adaptive braking force distribution between the wheel on the inside of the curve and the wheel on the outside of the curve on one axle as a function of the measured steering angle to achieve improved drive dynamics.

$F_v$: Substitute reference input variable for the front axle for the brake application force or the braking torque of a wheel of the front axle. (For the wheel units assigned to the rear axle, substitute reference input variable $F_H$ is used accordingly). Reference input variable $F_V$ is formed from the driver's intention regarding the operating brake and the parking brake and supplied to the two wheel units of the front axle and to the processing unit. The axle-specific reference input variable is used within a wheel unit to regulate the brake application force or the braking torque if no different reference input variable for each individual wheel has been formed in the processing unit or in the event of failure of the processing unit.

$r_1$: Control message to initiate a revised processing sequence in the wheel unit. This message is formed by the pedal unit or the processing unit from the incoming error signal messages from the connected system modules.

The signals arriving via the communication system are stored redundantly in memory cells $S_i$ of microcomputer system $R_{1A}$. In other embodiments, the following signals arriving via communication systems $K_1$ can also be processed for monitoring the function of the wheel unit:

$a_{R2}$, $a_{R3}$, $a_{R4}$ delays in the other wheels
$a_{V,ref}$ reference value of the delay difference between the wheels on the front axle
$S_{R2}$, $S_{R3}$, $S_{R4}$ slip of the other wheels
$\Delta S_{V,ref}$ reference value for the slip difference between the wheels on the front axle
$V_F$ estimated vehicle speed The following signals are sent via communication system $K_1$ as output variables of the wheel unit to the connected system modules:

$n_1$ processed rpm signal of the respective wheel
$d_1$ cyclic error signal message of the wheel unit
$F_{1i}$ measured actual value of the controlled variable In other embodiments, the following variables are also needed by wheel unit 12 for function monitoring in the other wheel units:

$a_{R1}$ delay of the respective wheel
$S_{R1}$ slip of the respective wheel

These signals are supplied to the other system modules via communication system $K_1$:

Wheel unit 12 has the following components:
 a) Microcomputer system $R_{1A}$ with the respective peripheral, memory and watchdog modules, b) Monitoring component $R_{1B}$
c) Electric motor $M_{1H}$ including the required gear stage for converting the rotational motion into a feed motion of the brake lining of a disk brake or a drum brake
d) Electromagnetically operated rack-out device $Ku_1$ which acts on a shaft inside the torque flow between the electric motor and the brake lining, said shaft being closed in the currentless state by a spring element, ensuring in this state that the prevailing angular position of the shaft is maintained. The design of this rack-out device must ensure that each controlled brake application force acting on the brake disk must be maintained.
e) Reset module $M_{1R}$ implemented in the form of an electric motor or electromagnetically operable rack-out device. This module receives power from power source $E_2$ and is driven by wheel unit 18.
f) Power electronics $LE_{1H}$ for controlling electric motor $M_{1H}$
g) Power electronics $LE_{1K}$ for controlling the electromagnetically operated rack-out device $Ku_1$
h) Power electronics $LE_{2R}$ for controlling reset module $M_{2R}$ which is integrated into wheel unit 18.

Items c), d) and e) are referred to below as actuator 12b of wheel unit 12.

The following input signals coming from the respective wheel are sent to microcomputer system $R_{1A}$ via peripheral input modules and stored redundantly in memory cells $S_i$: wheel rpm $n_1$, the actual value for the wheel brake application force and/or for wheel braking torque $F_{1i}$, the brake application path and/or angle of rotation of the gear stage or electric motor $S_{1H}$ and optionally the motor current $i_{1H}$ of the actuator.

Within microcomputers $R_{1A}$ reference input variable $F_{1F}$ is selected from variables $F_1$ and $F_V$ which are received cyclically over the communication channel. Control difference $x_{d1}$ is formed from this by using instantaneously measured value $F_{1i}$ for the wheel brake application force or the wheel braking torque according to the equation:

$$x_{d1}(t) = F_{1F}(t) - F_{1i}(t) \tag{1}$$

Using predetermined limit values $\epsilon$ and $\mu$ and intervals $T_\epsilon$ and $T_\mu$ the comparisons can be performed according to $$|x_{d1}(t)| \leq \epsilon \text{ for } 0 < t < T_\epsilon \tag{2}$$

$$|d\, x_{d1}(t)/dt| \leq \mu \text{ for } 0 < t < T_\mu \tag{3}$$

If conditions (2) and (3) are met, no control actions are taken on the actuator. If this condition is not met, the required instantaneous manipulated variable for correcting the wheel brake application force or the wheel braking torque is calculated by using a digital control algorithm and taking into account the manipulated variable output most recently (e.g., of a PI controller or a PID controller). This manipulated variable is output in the form of a PWM signal $u_{1H}$ to power electronics $LE_{1K}$. In addition, electromagnetically operated rack-out device $Ku_1$ is controlled by control signal $f_1$ and power electronics $LE_{1K}$, permitting a rotational motion of the motor to achieve a change in wheel brake application force. If conditions (2) and (3) are met while the brake application force or the wheel braking torque is being corrected, control of electromagnetically operated rack-out device $Ku_1$ is terminated and then electric motor $M_{1H}$ is switched to no current. To avoid an unwanted change in wheel brake application force because of a malfunction of microcomputer system $R_{1A}$, control of the electric motor by current $i_{1H}$ is made possible only if release signal $g_{1H}$ as well as release signal $e_{1H}$ from monitoring component $R_{1B}$ are present at the control part of power electronics $LE_{1H}$ (see AND link in $LE_{1H}$).

To be able to avoid an unintentional reduction in the wheel brake application force to be maintained by the rack-out device, control of rack-out device $Ku_1$ by current $i_{1K}$ is possible only when release signal $g_{1H}$ and release signal $e_{1H}$ are both supplied by monitoring component $R_{1B}$ (see AND link in $LE_{1K}$). By including the electromagnetic rack-out device in the control process, when the driver's intention is for approximately steady-state braking, the required brake application force can be applied first via the electric motor and then, without consuming electricity, it can be maintained by the spring forces within the electromagnetically operated rack-out device. Thus, the brake application forces required in operating the parking brake of a motor vehicle can be initiated and maintained without power consumption in a simple manner. To release the brake on one wheel, the rack-out device is first opened by control signal $f_1$ and then electric motor $M_{1H}$ is driven at a negative voltage. If this release is prevented by an error in the actuator, e.g., by jamming of the gear stage in the actuator, this fault can be recognized unambiguously by the measured wheel brake application force or wheel braking torque. This is done, for example, by comparing the control and the wheel rpm, optionally the angle of rotation. Jamming is recognized if, for example, no change in angle of rotation of the electric motor is recognized despite the control and/or the respective wheel has brake slip when there is no control. The regulation is then terminated and an error message $d_1$ is sent over the communication system. This message is analyzed in the pedal unit (10) and an error elimination measure is initiated resulting from this. From a release message $r_2$ sent via communication system $K_2$, wheel unit 18 shown in FIG. 5 receives the message to reset device $M_{1R}$ in actuator 12b via power electronics $LE_{1R}$ and control signal $i_{1R}$. Since reset device $M_{1R}$ is controlled by power source $E_2$, the brake function of the wheel assigned to wheel unit 12 can be released even when there is a failure in power source $E_1$.

Wheel unit 12 reacts similarly to a release message $r_1$ containing information on releasing the wheel assigned to wheel unit 18 which is braked in an error case. This type of message leads to output of signal $u_{2R}$, activating power electronics $LE_{2R}$. Control signal $i_{2R}$ for the response of the reset device in actuator 18b, however, is activated only if release signals $g_{2R}$ and $e_{2R}$ are available (see AND link in $LE_{2R}$).

The accuracy of the measured actual value of the wheel brake application force and/or the wheel braking torque can be guaranteed by analytical redundancy. With an implementation of this redundancy according to the present invention, one or more of the following measures can be carried out.

Comparison of the actual values of the wheel brake application force or the wheel braking torque with a reference variable $F_{r,a}$. To determine $F_{r,a}$, first the change in position or angle of rotation measured variable $s_{1H}$ after the start braking time is measured and then converted to the physical dimension of a force or a torque by using a function given by the design. This function takes into account all the elasticities of the components arranged within the force flow of the actuator. In the case of wheel braking torque control, a temperature-dependent friction model of the brake disk is also implemented in the function (e.g., modeling the heating and cooling of the disk).

Comparison of the actual value of the wheel brake application force or wheel braking torque within reference variable $F_{r,b}$. To determine $F_{r,b}$, the current of electric motor $M_{1H}$ is measured during a steady-state braking phase and then converted to the physical dimension of a force or a torque by using a previously determined function. This function first takes into account the design data of the electric motor and the gearing, optionally also taking into account a temperature and friction model. Furthermore, the instantaneous effective input voltage as well as the direction of rotation before reaching the steady-state operating point are taken into account. In the case of wheel braking torque control, a temperature-dependent friction model of the brake disk can also be implemented in the function.

Another method is based on a comparative analysis of wheel delay in the partial braking range. Calculation of wheel delay in individual wheel units is started by a message from the processing unit at time $T_x$. The delay of the wheel assigned to wheel unit 12 is calculated according to the equation:

$$a_{R1}(T_x)-C_1[n(T_x)-n(T_x-T_a)] \quad (4)$$

where $T_a$ is the cyclic sampling time at which the rpm determination is performed on each wheel unit, and $C_1$ is a constant fixed by wheel geometry and sampling time.

Delay difference $\Delta a_v(T_x)$ of the front axle wheels is formed from the delay values $a_{R1}(T_x)$ and $a_{R2}(T_x)$ for the wheels of front axle:

$$\Delta a_v(T_x)=a_{R1}(T_x)-a_{R2}(T_x) \quad (5)$$

Value $a_{r2}(T_x)$ required for this is sent from wheel unit 18 via communication system $K_1$. With proper functioning of the brake application force or braking torque control, the following applies for delay difference $\Delta a_v(T_x)$ $$|\Delta a_v(T_x)-\Delta a_{v,ref}(T_x)|<\epsilon_a \quad (6)$$

where $\Delta a_{v,ref}$ is a reference value for the delay difference of the wheels on the front axle. $\epsilon_a$ describes an error limit value that can be parameterized. Reference value $\Delta a_{v,ref}$ is calculated in the processing unit by a mathematical model using the cyclically detected measurement variables pertaining to drive dynamics, namely steering wheel angle $\delta_L$, transverse acceleration $a_y$ and yaw angle velocity $\Psi$ and taking into account an estimated vehicle speed $v_F$. If condition (6) is violated, this indicates a fault in the brake application force sensor or the braking torque sensor of one of the wheels. Using both wheels of an axle for fault detection eliminates disturbing influences acting on both wheels. In this method it is assumed that the functionality of the control algorithm and the manipulated variable output as well as fault-free detection of rpm on both wheels of the front axle are ensured by other monitoring methods. A detected fault is allocated to wheel unit 12 or wheel unit 18 by including both wheel delay values $a_{R3}(T_x)$ and $a_{R4}(T_x)$ for the rear axle (e.g., by comparing the individual variable with the corresponding variable of a rear wheel).

Another method is based on a comparative analysis of individual wheel slip values in the partial braking range. Calculation of slip in individual wheel units (12 through 18) is started by a message from the processing unit at time $T_x$. Within wheel unit 12, the slip of the respective wheel with wheel rpm $n_1$ and estimated vehicle velocity $v_F$ is calculated by the equation:

$$s_{R1}(T_x)=1-C_2n_1(T_x)/v_F(T_x) \quad (7)$$

Constant $C_2$ is determined by wheel geometry. Slip difference $\Delta s_v$ between the wheels on the front axle can be calculated by the following equation by using wheel slip $s_{R2}(T_x)$, which is sent from wheel unit 18 via the communication system:

$$\Delta s_V(T_x)=s_{R1}(T_x)-s_{R2}(T_x) \quad (8)$$

The following must apply for slip difference $\Delta s_v(T_x)$ with correct functioning of the brake application force and braking torque control:

$$|\Delta s_V(T_x)-\Delta s_{V,ref}(T_x)|_s<\epsilon_s \quad (9)$$

where $\Delta s_{v,ref}$ is a reference value for the slip difference of the wheels on the front axle, $\epsilon_s$ describes an error limit value that can be parameterized. Reference value $\Delta s_{v,ref}$ is calculated in the processing unit by a mathematical model of drive dynamics using cyclically detected measured variables, namely steering wheel angle $\delta_L$, transverse acceleration $a_y$ and yaw angle velocity $\Psi$ and taking into account the reference input variables for brake application forces and/or wheel braking torques for each individual wheel:

$$\Delta s_{V,ref}(T_x)=f_1\{\delta_L, a_y, \Psi, F_1, F_2, F_3, F_4\} \quad (10)$$

In another embodiment, an improved reference variable $\Delta s_{v,ref}$ can be determined by taking into account measured values and estimates for wheel loads $F_{N1}$, $F_{N2}$, $F_{N3}$ and $F_{N4}$. In addition, $\Delta s_{v,ref}$ is formed in the processing unit by using an expanded dynamic model. In this way, influences caused by wheel load displacement are taken into account in the calculation. If condition (9) is violated, a fault in the brake application force sensor or braking torque sensor of one of the wheels can be deduced. It is assumed that the functionality of the control functions as well as fault-free detection of rpm on both front axle wheels can be guaranteed by other monitoring methods. A recognized fault is allocated to wheel unit 1 or wheel unit 2 by including both slip values $s_{R3}(T_x)$ and $s_{R4}(T_x)$ for the wheels on the rear axle (e.g., by comparing the individual variable with the corresponding variable of a rear wheel).

The monitoring concept of the wheel module is structured with four logic levels $L_1$, $L_2$, $L_3$ and $L_4$ and two hardware levels. Microcomputer system $R_{1A}$ and monitoring component $R_{1B}$ work on the hardware levels.

Monitoring component $R_{1B}$ communicates with microcomputer system $R_{1A}$ via an internal bus system. This component serves to check the computational ability of this microcomputer system and to monitor the program sequences inside the computer. Mutual monitoring of these components is made possible by the selected type of data communication between microcomputer system $R_{1A}$ and monitoring component $R_{1B}$. The following functions are assigned to the logic levels:

A level 1 is implemented in microcomputer system $R_{1A}$. It carries out the following functions: calculating the control function for controlling electric motor $M_{1H}$; controlling electromagnetically operated rack-out device $Ku_1$; controlling reset module $M_{2R}$; performing calculations to check the accuracy of the measured actual value of the wheel brake application force or wheel braking torque $F_{1i}$ through the analytical redundancy described here.

A level 2 is also tied into microcomputer $R_{1A}$. This level is responsible for checking the accuracy of calculations performed in level 1 by using algorithms different from those in level 1. Furthermore, input data stored redundantly in memory cells $S_i$ is used to perform the calculations, thus permitting detection of errors due to corrupted memory contents. The regulator function is checked by a parallel-connected mathematical model of the regulator, which is calculated with redundantly stored data for alternative reference input variables $F_1$ and $F_v$ and actual value $F_{1i}$ of the wheel brake application force or wheel braking torque. If there are significant deviations between the model output variable and the calculations performed in level 1, an error status is detected. Furthermore, proper functioning of the controlled system is also checked in level 2. This is done with a mathematical model of the controlled system, describing the dynamic relationship between the manipulated variable and controlled variable $F_{1i}$ even taking into account disturbance variables. The manipulated variable calculated in the control algorithm in level 1 is sent to this model. An error state is recognized if there are significant deviations between the model output variable and measured actual value $F_{1i}$ of the wheel brake application force or wheel braking torque. Control signals $f_1$ for the electromagnetically operated rack-out device or $u_{2R}$ for the reset module are also checked for accuracy in level 2 and error states are optionally detected. The models used are derived from the physical relationships.

When an error is detected in level 3 as well as level 2, respective release signals $g_{1R}$ and $g_{2R}$ are reset, and an error message $d_1$ is sent via communication system $K_1$.

Level 3 is implemented in microcomputer $R_{1A}$. To guarantee reliable functioning of the wheel unit in the case of a computer error or program error, the programs in levels 1 and 2 must nevertheless run properly even in the event of an error, or the fact that they are not running properly must be detected reliably. In the embodiment presented here, this is monitored by a query/response communication in levels 3 and 4. Microcomputer system $R_{1A}$ retrieves a query from the monitoring computer and answers it, taking into account all safety-relevant program parts within a predetermined interval of time. A query can be answered correctly only if error-free rung of the programs for the computer function test and the command status check is ensured. Partial responses formed from the partial programs are summarized into an overall response and sent to level 4 in the monitoring component.

This level is implemented in the monitoring component. The overall response here supplied by microcomputer $R_{1A}$ is checked with regard to the interval of time of arrival and bit-accurate matching of the proper response for that query. If the query-response communication with level 3 does not run properly, release signals $e_{1H}$ and $e_{2R}$ are stopped in monitoring component $R_{1B}$.

In another embodiment (variant 2), the functions of two wheel units of one axle or one diagonal are integrated into a wheel pair unit according to the previous descriptions.

Figure 7:
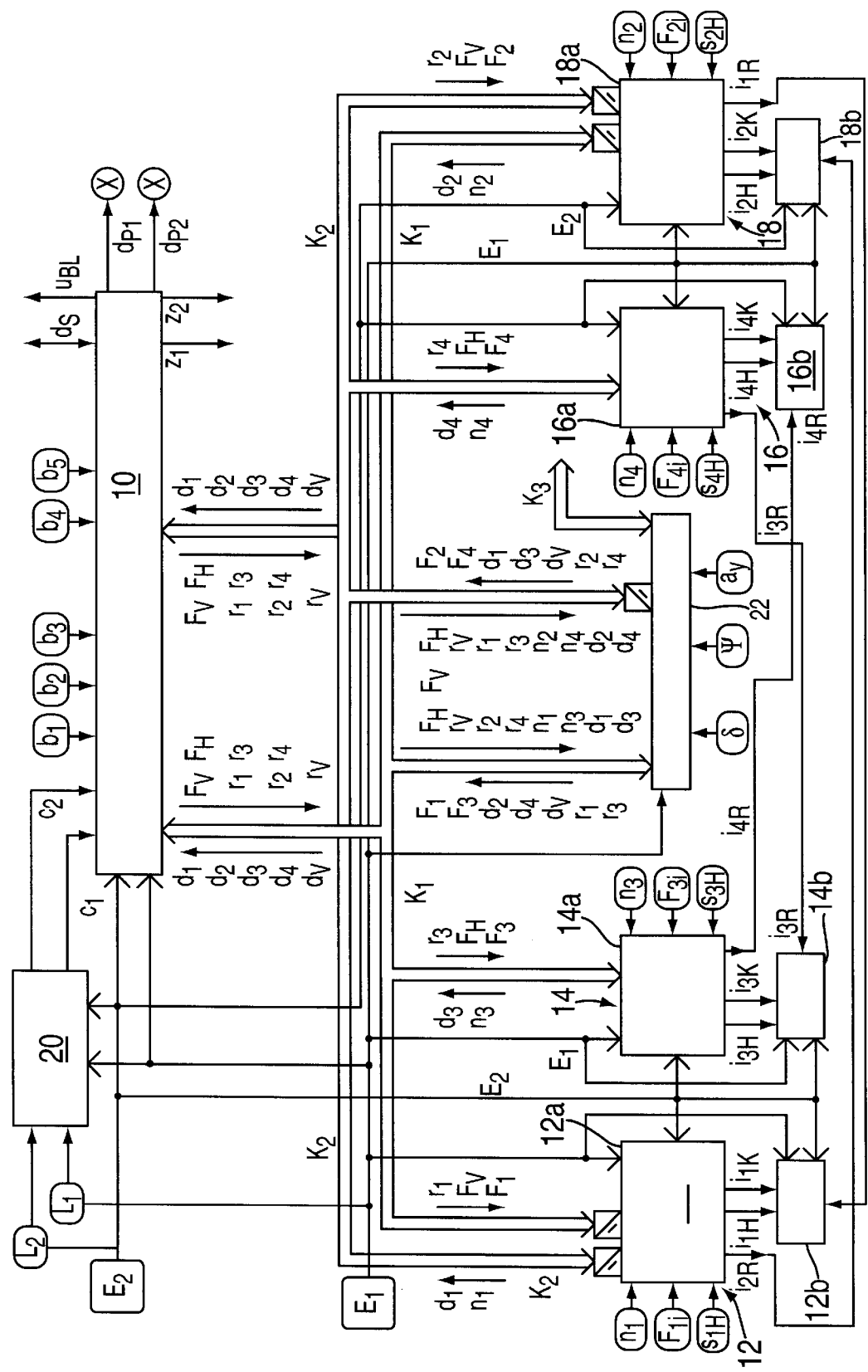
FIG. 7 illustrates a third embodiment of an electromechanical brake system according to the present invention.
Figure 8:
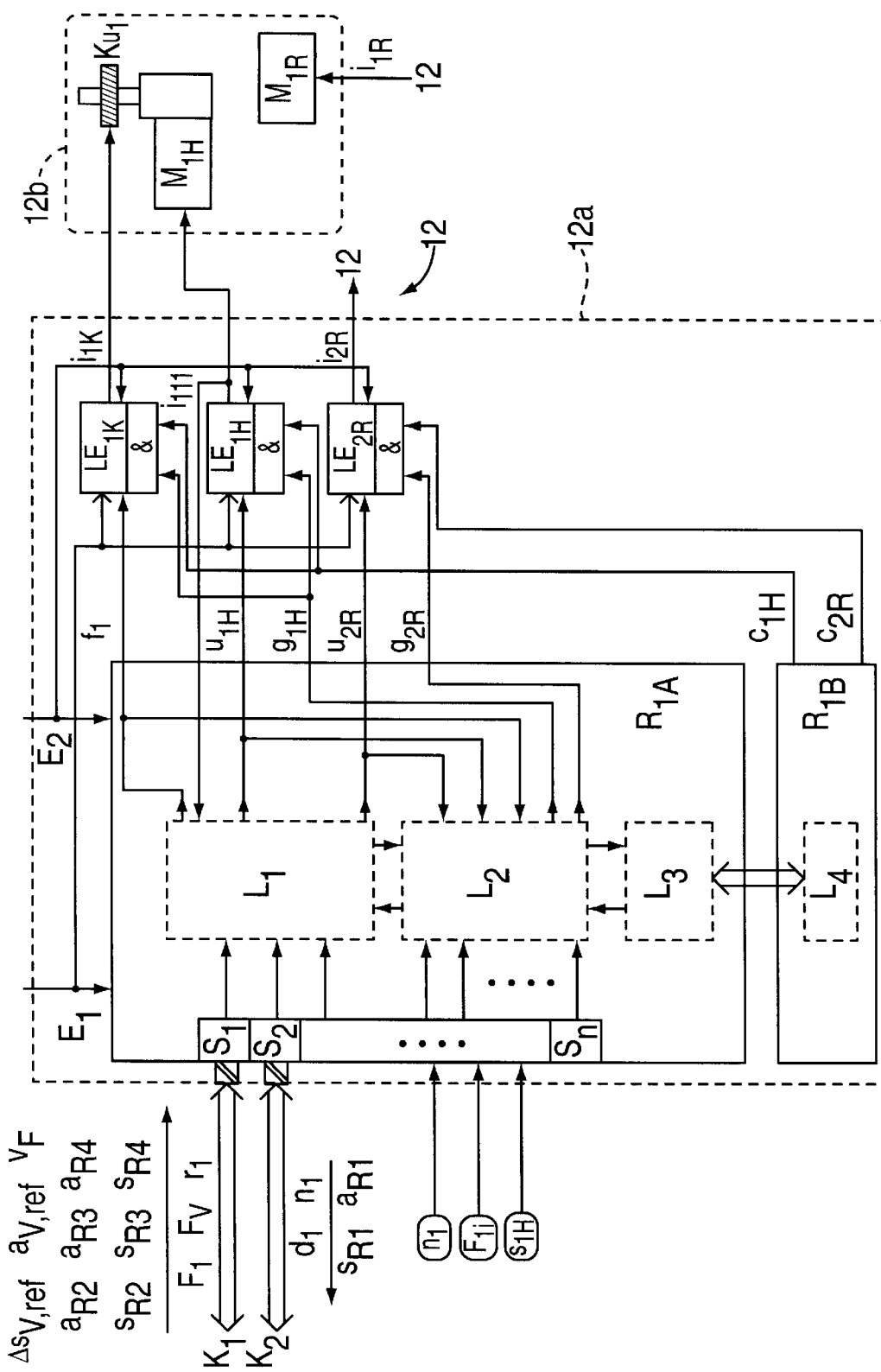
FIG. 8 shows a structure of a wheel unit employed in the the third embodiment of the electromechanical brake system according to the present invention.

In variants 1 and 2 of the electromechanical brake system, two wheels are always no longer ready for braking in the event of failure of one power supply or one of the communication systems $K_1$ or $K_2$. This disadvantage is avoided in embodiment 3. FIG. 7 shows the structure of this variant and FIG. 8 shows its wheel unit. This variant differs from variant 1 presented above in particular in that the wheel modules of the front wheels are each connected to the other system modules by redundant communication systems $K_1$ and $K_2$ and the wheel modules of the front wheels receive power from both power sources.

The functions described here are implemented by suitable programs running in suitable computers.

In addition to the use with electromechanical brake systems, the procedure described here can also be used with similar advantages with other electric brake systems, e.g., with electrohydraulic or electropneumatic brake systems.

Addendum: List of Notation $a_{R1}, a_{R2}, a_{R3}, a_{R4}$ wheel delay $a_{V,ref}, a_{H,ref}$ reference value for the delay difference between wheels on the front axle and between those on the rear axle $a_y$ transverse acceleration $b_1, b_2, b_3$ measurement signals indicating the driver's intention (e.g., brake pedal angle)

$b_4, b_5$ measurement signals indicating the driver's intention regarding the parking brake $b_{B,rep,1}, b_{B,rep,2}$ reference values indicating the driver's intention regarding the operating brake $b_{F,rep,1}, b_{F,rep,2}$ reference values indicating the driver's intention regarding the parking brake C internal communication system $c_1, c_2$ diagnostic signals indicating the charge state of the power supply systems d control signal of a diagnostic unit $d_{P1}, d_{P2}$ status messages regarding the state of the electromechanical brake system $d_S$ service interface in the pedal module $d_V$ error signals of the processing unit $d_1, d_2, d_3, d_4$ error messages of the wheel units $E_1, E_2$ power supply $e_{1H}, e_{2H}, e_{3H}, e_{4H}$ logic control signal for the power electronics of a wheel unit $e_{1R}, e_{2R}, e_{3R}, e_{4R}$ logic control signal for the power electronics of the reset device of a wheel unit $F_{B,res,1}, F_{B,res,2}$ reference input variable for the total force of the operating brake $F_{res}$ reference input variable for the driver's intention regarding the braking force $F_H$ reference input variable for the brake application force (or wheel braking torque) for wheels on the rear axle $F_F$ reference input variable for the parking brake force $F_{F,res,1}, F_{F,res,2}$ reference input variable for the total force of the parking brake $F_H$ reference input variable for the brake application force (or the wheel braking torque) for the wheels on the rear axle $F_1, F_2, F_3, F_4$ reference input variable for the wheel braking force or wheel braking torque for each individual wheel $F_{1F}, F_{2F}, F_{3F}, F_{4F}$ selected reference input variable for the wheel braking force or wheel braking torque for each individual wheel $F_{1i}, F_{2i}, F_{3i}, F_{4i}$ actual value for wheel braking force or wheel braking torque $f_1, f_2, f_3, f_4$ control signal for electromagnetic coupling in a wheel unit $g_{1H}, g_{2H}, g_{3H}, g_{4H}$ logic control signal for the power electronics in a wheel unit $g_{1R}, g_{2R}, g_{3R}, g_{4R}$ logic control signal for the power electronics of the reset device in a wheel unit $i_{1K}, i_{2K}, i_{3K}, i_{4K}$ current for controlling an electromagnetic rack-out device in a wheel unit $i_{1H}, i_{2H}, i_{3H}, i_{4H}$ current for controlling the electric motor in a wheel unit $i_{1R}, i_{2R}, i_{3R}, i_{4R}$ current for controlling the reset device in a wheel unit $K_1, K_2, K_3$ communication devices $LE_{1H}, LE_{2H}, LE_{3H}, LE_{4H}$ power electronics for controlling the electric motor $LE_{1K}, LE_{2K}, LE_{3K}, LE_{4K}$ power electronics for controlling the electromagnetically operated rack-out device $LE_{1R}, LE_{2R}, LE_{3R}, LE_{4R}$ power electronics for controlling the reset device $L_1$, $L_2$ Sensor for determining the charge state of a power supply
$n_1$, $n_2$, $n_3$, $n_4$ measured values for wheel rpm
$P_1$, $P_2$ microcomputers in the pedal module
$P_3$ monitoring component in the pedal module
$r_1$, $r_2$, $r_3$, $r_4$ control signals for initiating a change in processing sequence in the wheel units
$s_{H1}$, $s_{H2}$, $s_{H3}$, $s_{H4}$ brake application path of the brake disk or brake drum or angle of rotation of the electric motor or the gear stage
$s_{R1}$, $s_{R2}$, $s_{R2}$, $s_{R4}$ wheel slip
$S_1$ through $S_n$ memory cells in the wheel modules
$U_1$, $U_2$ input interfaces of the pedal unit
$u_{BL}$ control signal of the brake light
$u_{1H}$, $u_{2H}$, $u_{3H}$, $u_{4H}$ control signal for the power electronics of the electric motor in the wheel unit
$u_{1R}$, $u_{2R}$, $u_{3R}$, $u_{4R}$ control signal for the power electronics of the reset device in the wheel unit
$v_F$ estimated vehicle speed
$x_{d1}$, $x_{d2}$, $x_{d3}$, $x_{d4}$ control difference in a wheel unit
$z_1$, $z_2$ signal for initializing and disconnecting the components of the brake system
$\delta_L$ steering angle
$\psi$ yaw angle velocity
$\Delta s_{V,ref}$, $\Delta s_{H,ref}$ reference value for the slip difference between the wheels on the front axle and rear axle

What is claimed is:

1. An electric brake system for a motor vehicle including a plurality of wheel brakes, comprising:
   a unit for receiving operating signals from at least one driver-operated brake operating element and for determining setpoints for controlling the plurality of wheel brakes on the basis of the operating signals; and
   a plurality of units assigned to the plurality of wheel brakes of the motor vehicle and for converting the setpoints into control signals for the plurality of wheel brakes, wherein:
      each one of the plurality of units for converting the setpoints is assigned to a corresponding one of the plurality of wheel brakes, and
      each one of the plurality of units for converting the setpoints includes a self-monitoring microcomputer system.

2. An electric brake system for a motor vehicle including a plurality of wheel brakes associated with a plurality of wheels, comprising:
   a unit for receiving operating signals from at least one driver-operated brake operating element and for determining setpoints for controlling the plurality of wheel brakes on the basis of the operating signals;
   a plurality of units assigned to the plurality of wheel brakes of the motor vehicle and for converting the setpoints into control signals for the plurality of wheel brakes;
   a processing unit for determining setpoints for each one of the plurality of wheels; and
   at least two communication systems, wherein:
      the plurality of wheel brakes includes front wheel brakes and rear wheel brakes,
      at least one of the plurality of units assigned to the plurality of wheel brakes is assigned to the front wheel brakes,
      at least another one of the plurality of units assigned to the plurality of wheel brakes is assigned to the rear wheel brakes, and
      the at least one of the plurality of units assigned to the front wheel brakes is redundantly connected to the unit for receiving operating signals and the processing unit via the at least two communication systems and the at least one of the plurality of units assigned to the front wheel brakes receives power from at least two power sources.

3. An electric brake system for a motor vehicle including a plurality of wheel brakes associated with a plurality of wheels, comprising:
   a unit for receiving operating signals from at least one driver-operated brake operating element and for determining setpoints for controlling the plurality of wheel brakes on the basis of the operating signals, the unit for receiving operating signals including a computer channel for relaying setpoints for each axle of the motor vehicle;
   a plurality of units assigned to the plurality of wheel brakes of the motor vehicle and for converting the setpoints for controlling the plurality of wheel brakes into control signals for the plurality of wheel brakes;
   a processing unit for determining setpoints for each one of the plurality of wheels;
   at least two communication systems for interconnecting the unit for receiving operating signals, the plurality of units assigned to the plurality of wheel brakes, and the processing unit;
   a drive unit;
   a control unit for controlling the drive unit; and
   a third communication system for connecting the processing unit to the control unit, wherein, when an error occurs in the computer channel of the unit for receiving operating signals:
      the processing unit relays to the plurality of units assigned to the plurality of wheel brakes the setpoints relayed by the computer channel for each axle of the motor vehicle, instead of relaying the setpoints for each one of the plurality of wheels to the plurality of units assigned to the plurality of wheel brakes.

4. The brake system according to claim 3, wherein:
   the plurality of wheel brakes includes front wheel brakes and rear wheel brakes,
   at least one of the plurality of units assigned to the plurality of wheel brakes is assigned to the front wheel brakes,
   at least another one of the plurality of units assigned to the plurality of wheel brakes is assigned to the rear wheel brakes,
   the at least one of the plurality of units assigned to the front wheel brakes is redundantly connected to the unit for receiving operating signals and the processing unit via the at least two communication systems, and
   a minimum of the at least another one of the plurality of units assigned to the rear wheel brakes is connected via one of the at least two communication systems to the at least one of the plurality of units assigned to the front wheel brakes, to the unit for receiving operating signals, and to the processing unit.

5. The brake system according to claim 3, further comprising:
   at least two power supplies connected to the at least one of the plurality of units assigned to the front wheel brakes.

6. The brake system according to claim 3, wherein the plurality of units assigned to the plurality of wheel brakes of the motor vehicle include a microcomputer system and a monitoring component.

7. The brake system according to claim 6, wherein the microcomputer system includes a first logic level for calculating at least control functions for the plurality of wheel brakes.

8. The brake system according to claim 7, wherein the microcomputer system includes a second logic level for checking at least an accuracy of the control function calculation performed by the first logic level.

9. The brake system according to claim 8, wherein the microcomputer system includes a third logic level for performing at least one sequence check of a program of the first logic level and of a program of the second logic level on the basis of a query-response communication with the monitoring component.

10. The brake system according to claim 9, wherein the monitoring component includes a fourth logic level for checking an accuracy of a result of the at least one sequence check and for determining a query on which the at least one sequence check is based.

11. The brake system according to claim 3, wherein the plurality of units assigned to the plurality of wheel brakes check an accuracy of a measured value for at least one of a wheel brake application force and a braking torque on the basis of an analytical redundancy.

12. The brake system according to claim 11, wherein the check performed by the plurality of units assigned to the plurality of wheel brakes is performed on the basis of a comparison of the measured value for at least one of the wheel brake application force and the braking torque with a reference value derived from an angle of rotation variable in one of an area of one of the plurality of wheel brakes and a current through an electric motor of a brake actuator.

13. The brake system according to claim 11, wherein the check performed by the plurality of units assigned to the plurality of wheel brakes is performed on the basis of a comparative analysis of one of a delay and a slip of the plurality of wheels in a partial braking range by comparing a difference between corresponding values of two of the plurality of wheels with a calculated reference value.

* * * * *